Aug. 22, 1933. F. TROYK Re. 18,922

CUSHIONED CARTON

Original Filed June 21, 1928 3 Sheets-Sheet 1

Inventor:
Felix Troyk,
By Cromwell, Freight & Warden
Attys.

Aug. 22, 1933. F. TROYK Re. 18,922

CUSHIONED CARTON

Original Filed June 21, 1928 3 Sheets-Sheet 2

Inventor:
Felix Troyk,
By Cromwell, Greist & Warden
Attys.

Aug. 22, 1933. F. TROYK Re. 18,922

CUSHIONED CARTON

Original Filed June 21, 1928 3 Sheets-Sheet 3

Inventor:
Felix Troyk,
By Cromwell, Treist + Warden
Attys.

Reissued Aug. 22, 1933

Re. 18,922

UNITED STATES PATENT OFFICE 18,922

CUSHIONED CARTON

Felix Troyk, Morris, Ill., assignor to Self Locking Carton Company, a Corporation of Illinois Original No. 1,766,155, dated June 24, 1930, Serial No. 287,335, June 21, 1928. Application for reissue May 6, 1932. Serial No. 609,740

12 Claims. (Cl. 229—29)

The present invention relates to cartons for packing fragile articles, particularly eggs, and a primary object of the invention is to provide a simple and novel carton requiring a minimum amount of material and adapted to house a plurality of such articles and provide effective cushioning supports for the same.

An additional object is the provision of a carton which may be collapsed into flattened condition for shipping and easily erected by machinery.

A further object is to provide a carton of the type described in which the bottom portion may be moved from a collapsed position out of engagement with the transverse partitions into an erect position in which the bottom is bent upwardly and suspended under tension from the cross partitions to form a cushioned bottom.

A still further object is the provision of a one-piece carton in which the bottom wall is bent upwardly along its central portion to form a longitudinal partition, the sides of which are spaced below and joined at the apex thereof.

These and other objects will be apparent from a consideration of the following description of a preferred modification of my invention and by reference to the accompanying drawings, in which Fig. 1 is a plan view of the flattened blank from which my improved carton is constructed;

Figure 1:
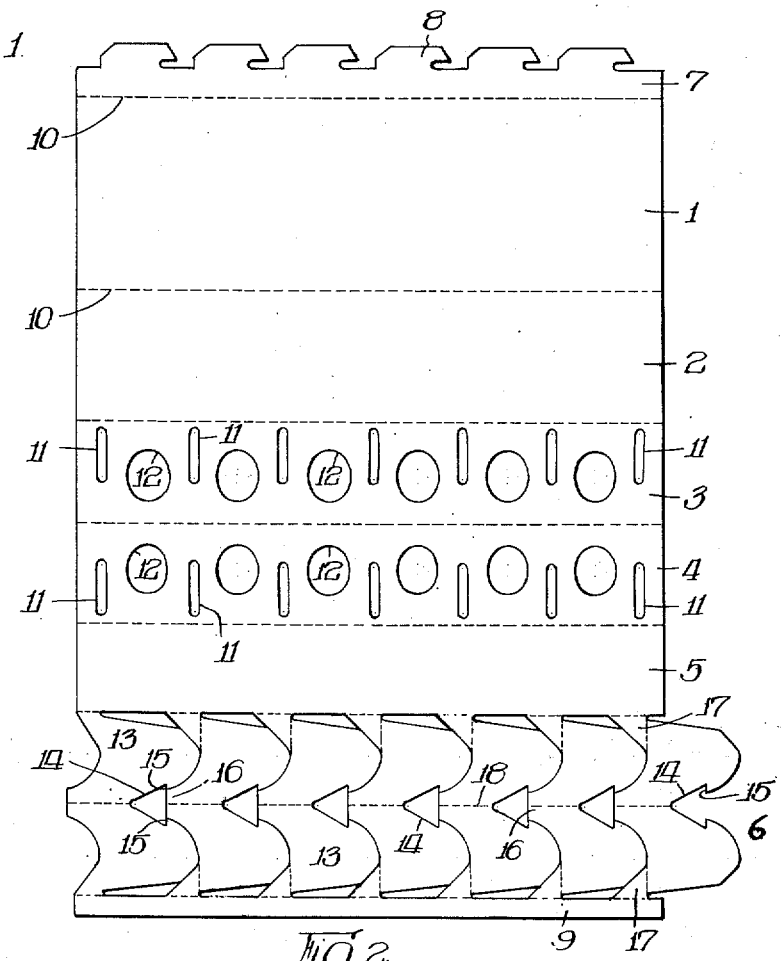

As shown in Fig. 1, a blank is formed from a sheet of cardboard by cutting and scoring the sheet to form, in the order named, cover-locking hooks 8, a locking strip 7, a cover 1, a rear wall or side 2, a bottom wall composed of two complementary sections 3 and 4, a front side or wall 5, a transverse partition section 6 having one side pivoted or hinged to the upper portion of the front wall, and the other side similarly attached to a narrow attaching strip 9.

The blank is scored along parallel lines indicated at 10 to mark the dividing lines between the several sections, including the locking strip and the attaching strip.

Each of the two bottom sections 3 and 4 is provided with slots 11 spaced from each other and arranged parallel with the long edges of the blank, there being one more slot in each section than there are to be compartments in one of the two rows in the completed carton. Each slot in one of the bottom sections is in line with the corresponding slot in the other section, the slots being spaced and positioned to correspond with the position of the cross partitions which divide the carton into individual cells.

Figure 3:
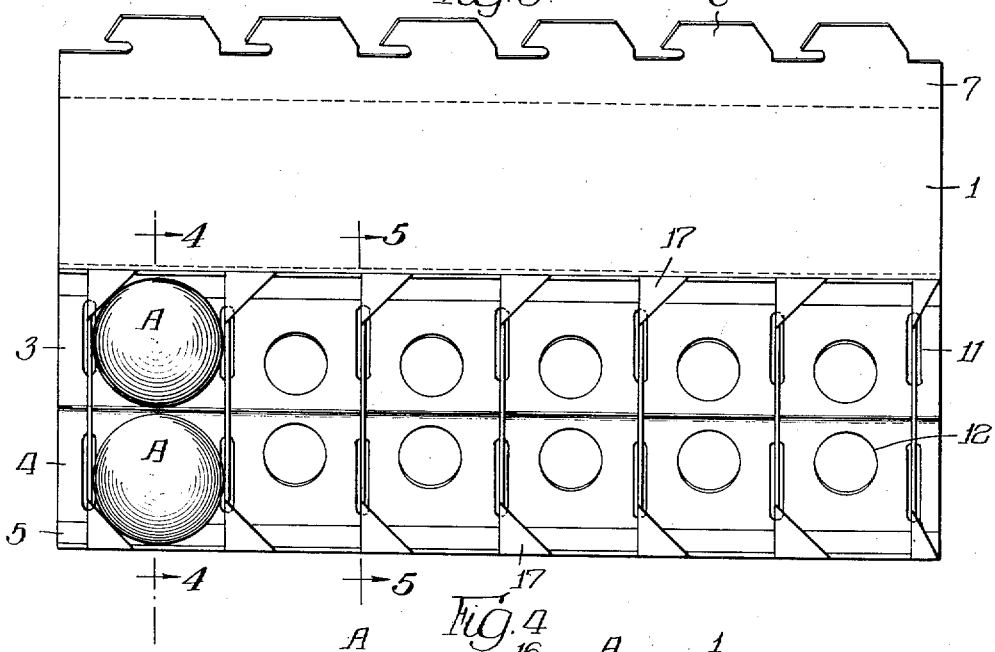
Fig. 3 is a top plan view of the carton showing the erected carton with the cover open and two eggs positioned in the carton.
Figure 4:
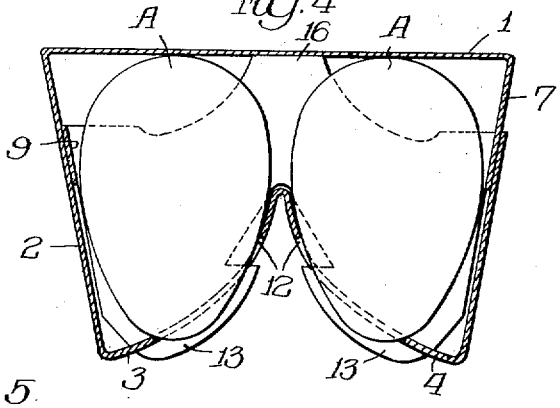
Fig. 4 is a sectional view taken along line 4—4 of Fig. 3, the cover being shown in closed position.

It is preferred to provide each of the bottom sections 3 and 4 with comparatively large holes 12 or similar means intermediate the slots 11 to receive eggs positioned in the carton, as will be seen in Figs. 3 and 4.

The cross partition section 6 is divided into individual cross partitions 13, there being as many cross partitions as there are slots 11 in one of the bottom sections. Each cross partition is joined at one side to the front wall 5 by means of triangular hinges 17 and at its opposite side to attaching strip 9 by similar triangular hinges 17. The edges of the hinges 17 to which the cross partitions are attached are substantially in the plane of the openings 11, thereby aligning the cross partitions therewith.

The transverse or cross partitions 13 are preferably tapered to decrease gradually in width from the hinges 17 to the lower or free ends of the partitions. In the lower central portion of each cross partition 13 is cut a deep notch which increases abruptly in width toward the bottom of the cross partition so as to leave a central opening 14 of substantially inverted V-shape and to form two connected substantially V-shaped flaps of each cross partition 13*a*. Hooks 15 are integral with the inner edges of the flaps 13*a* and extend inwardly into the central openings of the cross partitions. In other words, each cross partition may be said to be forked, that is, composed of a cross piece having two tapered prongs or legs provided with hook elements on their inner sides or edges. Cutting the blank to form the legs of a partition leaves a lateral projection 16 which appears on the upper portion of the next partition.

Figure 6:
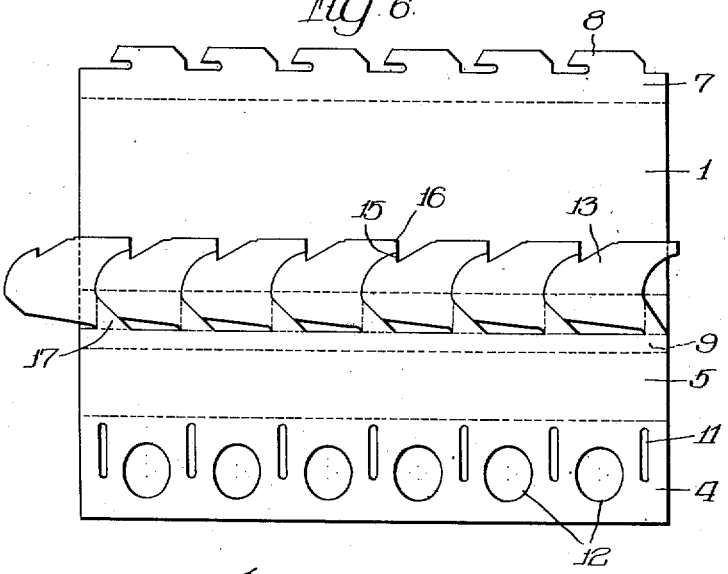
Fig. 6 is a plan view showing the carton in collapsed condition for shipment.
Figure 7:
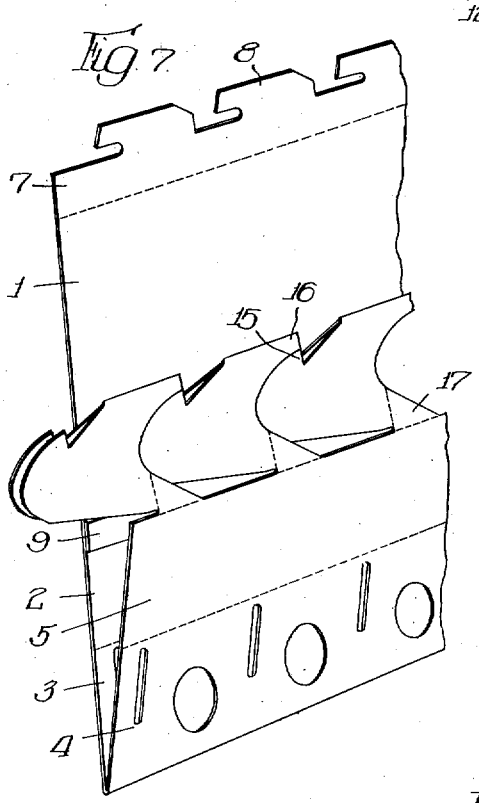
Fig. 7 is a perspective fragmentary view of the carton shown in Fig. 6 partially distended.

The blank shown in Fig. 1 is folded along the scoring between the bottom sections 3 and 4 and is also folded in the same direction of rotation along the scoring 18 through the center of the cross partitions 13. A suitable adhesive is applied to the attaching strip 9, and the latter is folded over and pressed against the back wall 2. This operation provides a collapsed or flattened unit, as shown in Figs. 6 and 7, which may be packed and shipped economically and conveniently. In this collapsed or knocked-down condition the bottom wall is folded downwardly or outwardly along its longitudinal center out of engagement with the cross partitions which are similarly folded upwardly. When so folded in this manner, the two halves of the partition section overlie each other, as do the two sections 3 and 4 of the bottom, and the front wall 5 overlies the rear wall 2, all in complementary arrangement.

To erect the carton, the front and rear walls are distended or separated, as by applying pressure along the fold in the cross partitions. When the walls are separated a distance substantially equal to the width of the cross partitions, the section 6 with its flaps or cross partitions in their original plane will lie substantially horizontal. The cross partitions are rotated about the triangular hinges 17 into a substantially vertical position, and the bottom wall is pressed upwardly along the scoring between the bottom sections 3 and 4 until the hooks 15 pass through and engage with the slots 11. The carton is then set up into the form shown in Figs. 3, 4 and 5.

Figure 2:
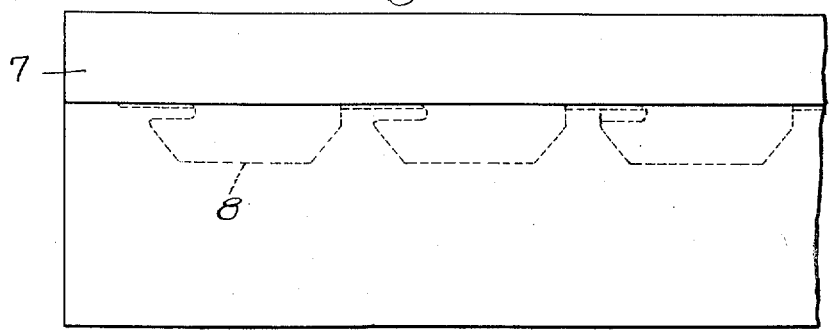
Fig. 2 is a front view, on a larger scale, of a fragment of the completed carton in a closed condition.

When the transverse partitions are swung down, the only portions of the section 6 that remain in the normal plane are the triangular pieces 17 adjacent the front and back walls, which triangular pieces form the connections between the transverse partitions and the front and rear walls of the carton. In closing the carton the cover is folded down and the hooks 8 on the locking strip are engaged beneath the triangular pieces 17 along the front wall of the carton in the usual manner, their position being shown in Fig. 2.

Figure 5:
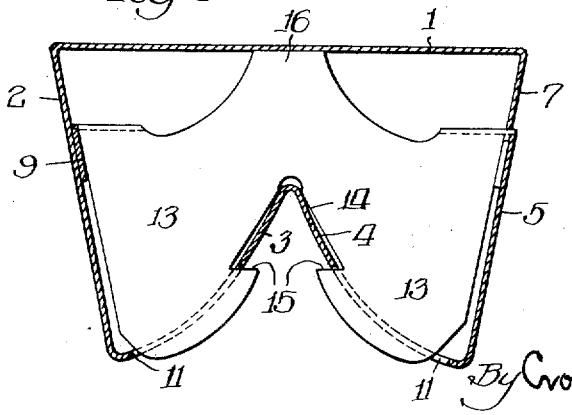
Fig. 5 is a sectional view taken along line 5—5 of Fig. 3, the cover being shown closed.

It is preferred that the bottom wall be wider than the width of the cross partitions or flaps, as shown in Fig. 1, so that there will be sufficient material in the bottom section to form an upwardly extending longitudinal partition of substantial height. By tapering the flaps toward their lower portion, the upward folding of the bottom wall and engagement of the hooks 15 with the slots 11 cause the front and rear walls 5 and 2 to assume a downwardly tapering position corresponding to the taper of the cross partitions, as shown in Figs. 4 and 5.

Egg cartons are used commercially primarily for the purpose of transporting eggs in shipping cases which may hold thirty dozen cartons. The cartons stacked side by side will contact only at their upper portion, due to the tapering side walls, whereby the eggs are protected against side thrusts.

In order to effect a better display of the eggs and to conserve material, it is preferred that the front wall of the carton be of substantially less height than the rear wall. In this case the attaching strip 9 is positioned against the rear wall at a height corresponding to the height of the front wall by folding the blank along the center of the bottom and the center of the cross partitions. The projections 16 on the cross partitions extend upwardly to a point adjacent the under side of the cover, thereby forming a brace which protects the eggs from damage, due to thrusts or pressure from the top.

Engagement of the cross partitions and the bottom sections is preferably effected by first rotating the cross partitions into vertical position and then pressing the bottom sections upwardly along their central portion. The bottom wall also may be pressed up into erected position and the cross partitions subsequently folded downwardly until the hooks 15 snap into engagement with the slots 11.

In erected condition the bottom wall is of substantially inverted V-shape, and contacts a flat surface upon which the box is placed only at its point of jointure with the front and rear walls. The inverted V-shaped bottom forms a longitudinal ridge or partition, the side walls of which are spaced below and jointed at their apex. The carton is divided by the longitudinal partition into two longitudinal rows of cells having an intervening space which prevents contact of the eggs through the longitudinal partition. Also, by so spacing the sides of the longitudinal partition it is possible to press the bottom into engagement with the cross partitions by means of a bar or other mechanical device.

When eggs, of which two are indicated at A in Figs. 3 and 4, are placed in the carton, each will be in its own individual compartment bounded on two sides by the transverse partitions and spaced from the corresponding egg in the opposite row by the central partition. In the modification shown, the longitudinal partition is of less height than the height of the box. The eggs may project partially through underlying holes 12 in the bottom section, these holes permitting eggs of larger dimensions to enter the V-shape bottoms of the compartments than would be the case if the holes were not there.

The resilience of the cardboard causes the upwardly folded bottom portion to tend to return to its normal position, thereby suspending the bottom under tension from the cross partitions. The cross partitions are preferably made sufficiently long so that when turned down and engaged with the bottom sections, their lowermost points will rest on a flat surface upon which the carton is positioned, thereby forming a rest and support for the latter.

Various modifications of the one-piece cushion bottomed carton described heretofore will occur to one skilled in the art, and such modifications as come within the spirit of my invention are intended to be included in the appended claims.

I claim:

1. A carton having a continuous bottom wall bent into the form of an inverted V, and forked transverse partitions having prongs shaped to fit into and fill the valleys in the bottom of the carton and secured at their upper ends to the adjacent side walls of the carton, said bottom wall having slots registering with the partitions, and elements on said partitions extending through said slots.

2. A carton having a continuous bottom wall bent into the form of an inverted V, and forked partitions secured at their upper ends to the adjacent side walls of the carton, said bottom wall having slots registering with the partitions, and the prongs of said partitions having elements extending through said slots.

3. A carton having a bottom wall in the form of an inverted V, and partitions secured at their upper ends to the adjacent side walls of the carton and shaped to straddle the ridge of the bottom wall when swung down, said bottom wall having slots registering with the partitions, and said partitions having elements extending through said slots, and transverse shoulders on said elements engaged with the carton-material bounding the upper ends of the slots.

4. A carton having a bottom wall in the form of an inverted V, transverse partitions joined at their upper ends to the adjacent side walls of the carton and shaped to straddle the ridge of the bottom wall when swung down, said bottom wall having at each side of and at some distance from the ridge therein slots registering with the said partitions, elements on said partitions extending down through said slots and constituting supports, a cover for the top of the carton, and there being upward extensions at the middles of the said partitions adapted to engage with the under side of the cover when the latter is closed.

5. A carton having a bottom wall in the form of an inverted V, transverse partitions fitting into and filling the valleys in the bottom of the carton and connected at their upper ends to the adjacent side walls of the carton, said bottom wall having on each side of the ridge therein slots registering with the partitions, elements on said partitions extending through said slots to constitute supports, and there being large openings in the bottom wall on each side of the ridge, each opening lying midway between two adjacent partitions.

6. A carton made of a single blank folded and glued to produce a shell having a continuous bottom in the form of an inverted V, two sides and a top, the top being cut transversely to the ridge in the bottom to produce flaps each connected at one end to the sides and capable of being swung into vertical positions to constitute transverse partitions, the lower ends of said flaps, when swung down, being shaped to straddle the ridge in the bottom, said bottom having slots registering with the lower ends of the flaps when the latter are swung down, and said flaps having projections extending through said slots.

7. A carton having a continuous bottom wall bent into the form of an inverted V, said bottom wall having transverse slots in the slopes thereof, forked partitions secured at their upper ends to the adjacent side walls of the carton, the prongs of the partition being shaped to fit into the valleys in the bottom of the carton when swung down, and hook elements on the ends of said prongs adapted to extend through said slots to interlock the partitions with the bottom wall and serve as suspending means for the latter.

8. A carton made of a single blank cut, scored and folded to form front and rear walls, cross partitions hinged to said walls and having hooks on their lower portion, and a bottom wall suspended in inverted V-shape from the hooks on said cross partitions, the legs of said V being spaced below and joined at the apex thereof.

9. A carton made of a single blank cut, scored and folded to form a rear wall, a front wall, a bottom and longitudinal partition forming section wider than the distance between the front and rear walls, cross partitions hinged to the front and rear walls, and interengaging means on said cross partitions and said section for holding the latter suspended in substantially inverted V-shape above the plane of the bottom of the walls, the sides of said V being integrally joined at their apex and spaced apart at all points therebelow.

10. A carton made from a single blank cut, scored and folded to form front and rear walls, cross partitions hinged to said walls, a continuous bottom raised above the bottom of the front and rear walls and suspended under tension to said cross partitions to form a central partition the sides of which are spaced apart below and joined at their apex, said suspension being effected by cooperating hooks and slots on said cross partitions and bottom.

11. A cellular carton of the type described, comprising front and rear walls, cross partitions hinged to said walls, a continuous bottom and longitudinal partition forming section joined to said walls and being inclined upwardly toward the center of the carton in substantially inverted V-shape, the legs of said V being integrally joined at their apex and spaced apart at all points therebelow, and means for securing said section to said cross partitions.

12. A carton made from a single blank cut, scored and folded to form front and rear walls, cross partitions hinged to said walls, and a bottom and longitudinal partition forming section of substantially inverted V-shape having its outer portions connected to the lower edges of said front and rear walls and being provided with openings corresponding in position to the position of said cross partitions, said cross partitions having projections extending through said openings and suspending said section out of contact with a flat surface upon which said carton is positioned.

FELIX TROYK.